United States Patent
Klug et al.

(10) Patent No.: US 7,767,362 B2
(45) Date of Patent: *Aug. 3, 2010

(54) DEPOSITION OF PHOTOSENSITIVE MEDIA FOR DIGITAL HOLOGRAM RECORDING

(75) Inventors: Michael A. Klug, Austin, TX (US); Paul A. Parks, Austin, TX (US)

(73) Assignee: Zebra Imaging, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/857,156

(22) Filed: Sep. 18, 2007

(65) Prior Publication Data

US 2008/0008939 A1    Jan. 10, 2008

Related U.S. Application Data

(63) Continuation of application No. 11/054,839, filed on Feb. 10, 2005, now Pat. No. 7,271,940.

(60) Provisional application No. 60/543,239, filed on Feb. 10, 2004.

(51) Int. Cl.
   G02B 27/22      (2006.01)
   G03H 1/02       (2006.01)

(52) U.S. Cl. .................... 430/1; 430/2; 156/242; 156/273.3; 156/272.2; 156/272.8; 156/273.5

(58) Field of Classification Search .................... None
See application file for complete search history.

(56) References Cited

U.S. PATENT DOCUMENTS

| | | | |
|---|---|---|---|
| 3,658,526 A * | 4/1972 | Haugh | 430/1 |
| 4,588,664 A * | 5/1986 | Fielding et al. | 430/1 |
| 4,840,757 A * | 6/1989 | Blenkhorn | 264/485 |
| 4,886,012 A * | 12/1989 | Ikeno et al. | 118/667 |
| 4,933,120 A * | 6/1990 | D'Amato et al. | 264/1.34 |
| 5,162,929 A * | 11/1992 | Roddy et al. | 359/17 |
| 5,339,305 A * | 8/1994 | Curtis et al. | 369/103 |
| 5,340,637 A * | 8/1994 | Okai et al. | 428/167 |
| 5,477,347 A * | 12/1995 | Redfield et al. | 359/3 |
| 5,504,593 A * | 4/1996 | Hotta et al. | 359/1 |
| 5,519,517 A * | 5/1996 | Redfield et al. | 359/22 |
| 5,801,857 A * | 9/1998 | Heckenkamp et al. | 359/2 |
| 6,127,066 A * | 10/2000 | Ueda et al. | 430/1 |
| 6,236,475 B1 | 5/2001 | Kihara et al. | 359/23 |
| 6,262,819 B1 | 7/2001 | Shirakura et al. | 359/35 |
| 6,309,735 B1 * | 10/2001 | Ueda et al. | 428/195.1 |

(Continued)

FOREIGN PATENT DOCUMENTS

EP   0 952 009 A   10/1999

(Continued)

*Primary Examiner*—Martin J Angebrannnt
(74) *Attorney, Agent, or Firm*—Campbell Stephenson LLP (57) ABSTRACT

Hologram production devices can include holographic recording material deposition systems to deposit holographic recording material as needed by the hologram production device. Various nozzles, ink jets, and similar devices can be used to deposit one or more components of the holographic recording material on to an appropriate substrate. If needed, the material is pre-processed to, for example, provide material stability for the holographic recording material. Once holograms are recorded in the holographic recording material, the material can be post-processed as desired.

36 Claims, 3 Drawing Sheets

U.S. PATENT DOCUMENTS

| | | | |
|---|---|---|---|
| 6,330,088 B1 | 12/2001 | Klug et al. | 359/23 |
| 6,366,368 B1 | 4/2002 | Horimai | 359/9 |
| 6,806,982 B2 | 10/2004 | Newswanger et al. | 359/35 |
| 6,841,116 B2 | 1/2005 | Schmidt | 264/401 |
| 6,859,293 B2 | 2/2005 | Klug et al. | 359/4 |
| 7,271,940 B2 * | 9/2007 | Klug et al. | 359/35 |
| 2002/0163873 A1 * | 11/2002 | Kawano et al. | 369/103 |
| 2003/0044691 A1 * | 3/2003 | Setthachayanon et al. | 430/1 |
| 2003/0058490 A1 | 3/2003 | Brothereton-Ratcliffe et al. | 359/1 |
| 2004/0173144 A1 | 9/2004 | Edwards et al. | 118/300 |
| 2004/0201659 A1 | 10/2004 | Watanabe | 347/100 |
| 2004/0231593 A1 | 11/2004 | Edwards et al. | 118/719 |
| 2004/0231594 A1 | 11/2004 | Edwards et al. | 118/719 |
| 2004/0238522 A1 | 12/2004 | Edwards et al. | 219/444.1 |
| 2004/0240010 A1 | 12/2004 | Takeyama | 359/15 |
| 2004/0261700 A1 | 12/2004 | Edwards et al. | 118/679 |
| 2005/0000422 A1 | 1/2005 | Edwards et al. | 118/696 |
| 2005/0016451 A1 | 1/2005 | Edwards et al. | 118/715 |
| 2006/0233953 A1 | 10/2006 | Renn et al. | 427/248.1 |

FOREIGN PATENT DOCUMENTS

| | | | |
|---|---|---|---|
| WO | 01/11426 | * | 2/2001 |

* cited by examiner

DEPOSITION OF PHOTOSENSITIVE MEDIA FOR DIGITAL HOLOGRAM RECORDING

This application is a continuation of U.S. patent application Ser. No. 11/054,839, filed on Feb. 10, 2005, entitled "Deposition of Photosensitive Media for Digital Hologram Recording" and naming Michael A. Klug and Paul A. Parks as inventors: which claims the benefit, under 35 U.S.C. §119(e), of U.S. Provisional Application No. 60/543,239, filed Feb. 10, 2004, entitled "Ink-Jet Deposition Of Photosensitive Media For Digital Hologram Recording," and naming Michael A. Klug and Paul A. Parks as inventors. The above-referenced applications are hereby incorporated by reference herein in their entirety.

BACKGROUND OF THE INVENTION

1. Field of the Invention

The present invention relates in general to the field of hologram production and, more particularly, to the deposition of photosensitive material for hologram production.

2. Description of the Related Art

Numerous devices and techniques have been disclosed for producing and displaying various types of holograms including one-step techniques, updateable techniques, techniques relying on fringe pattern calculation, and traditional object/reference beam interference techniques. Moreover, the subject matter of the scenes displayed in such holograms varies from simple demonstration scenes, to artistic renderings, to portraits, to scenes of complex devices or spaces, and beyond. One important part of any hologram production system or display is the holographic recording material used.

Some of the limiting factors in the design of hologram production devices generally, and in the design of hologram hardcopy production systems in particular, are the requirements associated with the holographic recording material. Many such materials are difficult to handle and store, and they may have limited shelf life depending on the manner in which they are used. For example, since holographic recording systems use photosensitive media into which the holographic information is recorded during the authoring process, care must be taken to limit the media's exposure to light in advance of the recording process. State-of-the art digital hologram writing systems for hardcopy production, such as those developed by Zebra Imaging, Inc., accept photosensitive film or plates and produce three-dimensional displays for visualization and other applications. To date, such systems have made use of prefabricated materials that include holographic recording media such as photopolymers that were previously coated onto rigid or flexible substrates. These materials generally need to be kept under subdued lighting conditions prior to exposure because of the materials' photosensitivity.

Holographic recording material handling and accommodation considerations also complicate efforts to develop automated digital hologram writers. In general, such devices should be able to operate in a fairly automated manner, at reasonable speeds, yet still be relatively compact and easy to use. Handling large rolls or sheets of holographic recording material, coupled with the need to protect the material from the environment (e.g., light, contaminants, etc.) clearly posses significant challenges for hologram production devices. Thus, the nature of holographic recording materials and the manner in which they are used in holographic production systems have further complicated the development of automated digital hologram writers.

Accordingly, it is desirable to have improved systems and methods for providing holographic recording material to devices used to record holograms.

SUMMARY OF THE INVENTION

It has been discovered that hologram production devices can include holographic recording material deposition systems to deposit holographic recording material as needed by the hologram production device. Various nozzles, ink jets, and similar devices can be used to deposit one or more components of the holographic recording material on to an appropriate substrate. If needed, the material is pre-processed to, for example, provide material stability for the holographic recording material. Once holograms are recorded in the holographic recording material, the material can be post-processed as desired.

Accordingly, one aspect of the present invention provides an apparatus including a light source, a beam splitter, a holographic recording material deposition system, an object beam optical system, and a reference beam optical system. The light source produces a coherent beam. The beam splitter splits the coherent beam into an object beam and a reference beam. The holographic recording material deposition system is configured to deposit holographic recording material on to a substrate. The object beam optical system directs the object beam to interfere with the reference beam at the holographic recording material. The reference beam optical system directs the reference beam to interfere with the object beam at the holographic recording material.

Another aspect of the present invention provides a method. At least one component of a holographic recording material is deposited on a substrate to form a holographic recording material layer. Data is provided for at least one hogel to a spatial light modulator. An object beam from a laser is intensity modulated with the spatial light modulator. The object beam is coupled into the holographic recording material layer. A portion of the holographic recording material layer is exposed to an interference pattern formed by a reference beam from the laser and the object beam from the laser.

Still another aspect of the present invention provides an apparatus including: a means for depositing at least one component of a holographic recording material on a substrate to form a holographic recording material layer; a means for intensity modulating an object beam from a laser; a means for providing data for at least one hogel to the means for intensity modulating the object beam from the laser; a means for coupling the object beam into the holographic recording material layer; and a means for coupling a reference beam from the laser into the holographic recording material layer to form an interference pattern.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present inventions may be better understood, and their numerous objects, features, and advantages made apparent to those skilled in the art by referencing the accompanying drawings.

DETAILED DESCRIPTION

The following sets forth a detailed description of the best contemplated mode for carrying out the invention. The description is intended to be illustrative of the invention and should not be taken to be limiting.

The holograms, devices for use with holograms, and related techniques described in the present application can generally make use of a variety of hologram production technologies including one-step techniques, updateable techniques, techniques relying on fringe pattern calculation, and traditional object/reference beam interference techniques.

One-step hologram (including holographic stereogram) production technology has been used to satisfactorily record holograms in holographic recording materials without the traditional step of creating preliminary holograms. Both computer image holograms and non-computer image holograms can be produced by such one-step technology. In some one-step systems, computer processed images of objects or computer models of objects allow the respective system to build a hologram from a number of contiguous, small, elemental pieces known as elemental holograms or hogels. To record each hogel on holographic recording material, an object beam is typically directed through or reflected from a spatial light modulator (SLM) displaying a rendered image and then interfered with a reference beam. Examples of techniques for one-step hologram production can be found in U.S. Pat. No. 6,330,088 entitled "Method and Apparatus for Recording One-Step, Full-Color, Full-Parallax. Holographic Stereograms," naming Michael A. Klug, Mark E. Holzbach, and Alejandro J. Ferdman as inventors, ("the '088 patent") which is hereby incorporated by reference herein in its entirety.

In general, the techniques described in the '088 patent and other prior art techniques do not provide for both hologram recording and display in real-time. Moreover, these techniques are not designed to produce active or quickly-updateable displays. However, certain types of holographic recording materials can be used to updateably record holographic stereograms formed either from calculated fringe patterns displayed on specialized SLM, or from fringe patterns generated through interference of an object laser beam containing image information with a reference laser beam. Previously recorded holographic stereograms or component hogels are updated by erasing the stereograms or component hogels and recording updated stereograms or component hogels, or by recording updated stereograms or component hogels in a separate portion of the holographic recording material. Examples of such techniques for hologram production can be found in U.S. patent application Ser. No. 10/691,041 entitled "Active Digital Hologram Display," naming Michael A. Klug, Craig Newswanger, Qiang Huang, and Mark E. Holzbach as inventors, ("the '041 application") which is hereby incorporated by reference herein in its entirety.

While the hologram recording devices described, for example, in the '088 patent make use of both continuous wave (CW) and pulsed lasers, CW lasers can be less desirable for updateable holographic displays because they present certain limitations. Chief among those limitations is the relatively low output power of CW lasers which causes the hologram recorder to use relatively long exposure times (e.g., tens of milliseconds) for each hogel. During those exposure times, the entire hologram production system is particularly susceptible to mechanical vibration. Great effort is expended to reduce or eliminate the mechanical vibrations. Hologram recorders are typically located far away from sources of environmental vibration, such as outside traffic, building vibration, mechanical equipment, common appliances, human motion, acoustic noise, plumbing turbulence and air flow. Special devices, such as vibrationally-isolated optics tables, are typically used where environmental vibration sources cannot be sufficiently reduced or eliminated. Such devices and techniques add cost and complexity to hologram production systems. Moreover, to help ensure a stable hogel recording environment, a step-repeat approach is often adopted in translating the holographic recording medium or the recording optics with respect to the recording medium. Consequently, additional settling time (on the order of tens of milliseconds as well) is introduced into the recording process. The cumulative recording and settling times prolong the hologram production process, often making it impractical for certain applications. Moreover, the mechanical systems used to step the system, bring (or allow) the system to come to a stop, and repeat can be very complex.

Using pulsed lasers in hologram production devices can mitigate or solve many of the aforementioned problems associated with CW laser use. Due to the different physics of pulsed laser operation, a small frame pulsed laser is able to generate higher light intensity than its CW counterparts. For example, small frame frequency doubled Nd:YAG pulsed lasers can generate 1.1 mJ of energy during a 35 ns long pulse at 532 nm. This corresponds to approximately 31.4 kW of power during the pulse. In contrast, a typical CW ND:YAG laser produces approximately 4 W of power. Because high exposure intensity is possible using pulsed lasers, the required exposure time to generate a hologram can be reduced significantly. While tens of milliseconds is typically needed for CW laser hologram recording, the tens of nanoseconds pulse duration of a pulsed laser is adequate for pulsed laser hologram recording. Decreasing the exposure time by six orders of magnitude means that the frequencies of both the movement of the hologram recorder components and environmental vibration are too low to generate any noticeable effect on interference pattern generation. The mechanical stability requirements restricting the CW laser based hologram recorder are significantly relaxed. Consequently, the recorder design can be significantly simplified and the cost of the hardware is reduced.

Thus, although the presently described systems and methods are not limited to the use of pulsed laser systems, the use of pulsed laser systems will be emphasized in this description. Moreover, the systems and methods described herein can make use of the devices and processes for recording holograms using pulsed lasers as described in U.S. patent application Ser. No. 10/167,759 entitled "Pulsed-Laser Systems and Methods for Producing Holographic Stereograms," naming Craig Newswanger, Pankaj Lad, Robert L. Sitton, Qiang Huang, Michael A. Klug, and Mark E. Holzbach as inventors, (the '759 application) which is hereby incorporated by reference herein in its entirety.

Figure 1:
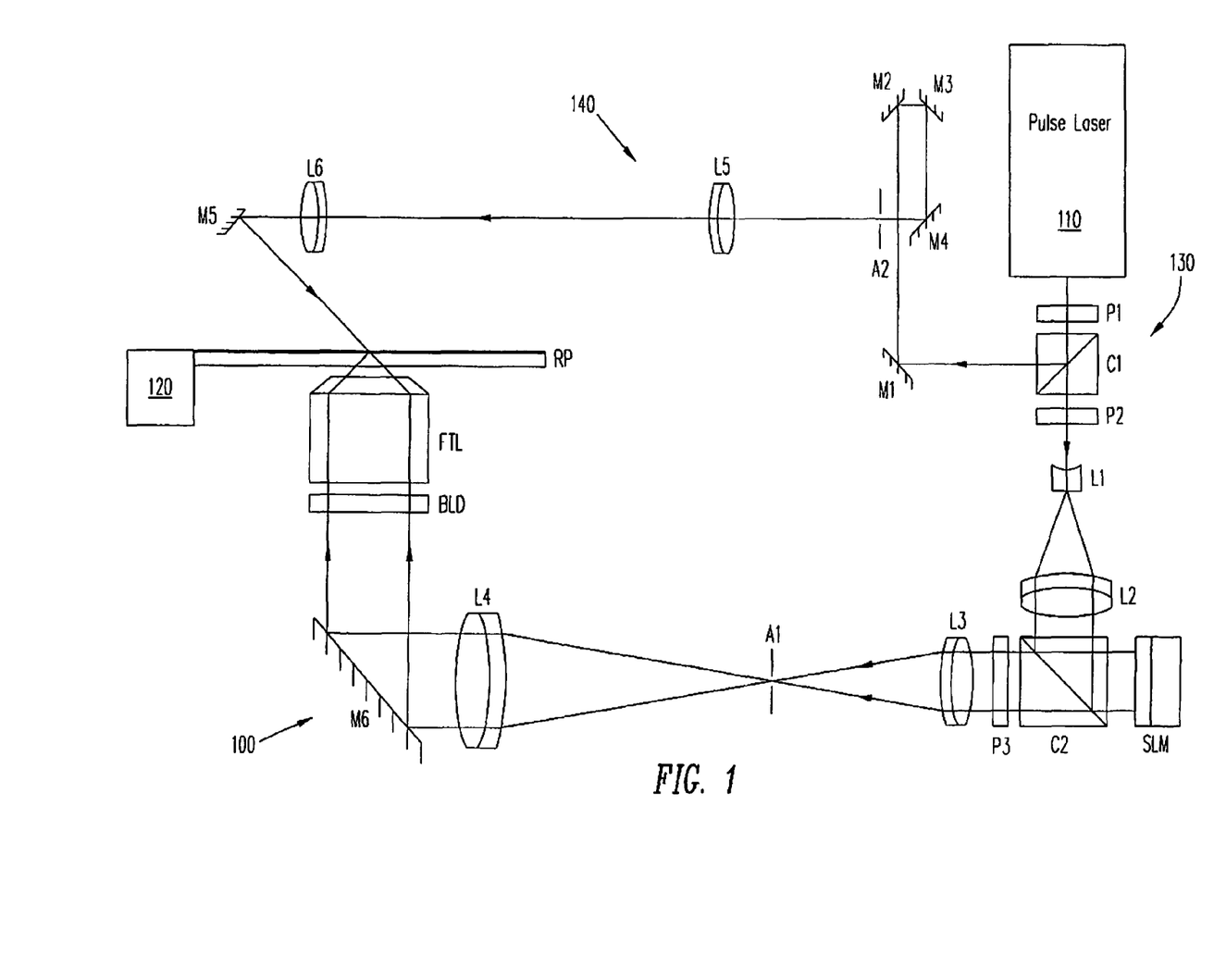
FIG. 1 is a schematic diagram of a hologram production device using a pulsed laser.

FIG. 1 is a schematic diagram of a pulsed laser based hologram production device that can take advantage of, for example, the hologram production techniques described in the '759 application, the '041 application, and the '088 patent, and can be used in conjunction with the devices and techniques described herein. Although a pulsed laser is illustrated, similar systems can use CW lasers. Hologram recorder 100 is designed to rapidly produce horizontal-parallax-only (HPO) or full parallax holograms and particularly holographic stereograms. The main components of hologram recorder 100 are pulsed laser 110, synchronized holographic recording material translating system 120, object beam optical system 130 and reference beam optical system 140. In other implementations, the recording material is kept stationary, and object beam optical system 130 and reference beam optical system 140 are translated with respect to the recording material. In still another implementation, object beam optical system 130 and reference beam optical system 140 are combined together so that only one optical system need be translated.

Although hologram recorder 100 is shown having only one pulsed laser, hologram recorder 100 can in general be constructed with several different pulsed lasers (or one pulsed laser capable of providing laser output at multiple wavelengths) to enable recording of multi-color holograms and holographic stereograms. Thus, the systems and methods described in the aforementioned '088 patent can be extended to the use of pulsed laser hologram recorders such as recorder 100.

An example of a pulsed laser 110 that can be used in hologram recorder 100 is the 212 Series (e.g., model 212S-532-3500) diode-pumped, Q-switched pulsed Nd:YAG laser manufactured by Lightwave Electronics Corporation of Mountain View, Calif. Those having ordinary skill in the art will readily recognize that a variety of different pulsed lasers can be used in hologram recorder 100. In general, the laser wavelength, laser pulse power, and laser pulse energy of a particular pulsed laser system are the determining factors for use in a hologram recorder.

For multiple color, e.g., red-green-blue (RGB), laser pulses, a variety of different laser systems can be used including diode-pumped solid state lasers, flash-lamp pumped solid state lasers, and dye lasers. Typical solid-state laser gain media include ruby, sapphire, garnet, alexandrite, Titanium sapphire (Ti:sapphire), Neodimium:Yttrium Aluminum Garnet (Nd:YAG), and Neodimium:Yttrium Lithium Fluoride (Nd:YLF). In one example, optical parametric oscillators (OPOs) are used to down convert laser frequency. For example, a frequency tripled Nd:YAG laser can produce 355 nm pulses which in turn drive a tunable OPO to produce pulses ranging from 410 nm to 690 nm. In another example, a Nd:YLF laser produces 1047 nm pulses which are then converted through second-harmonic generation to 523 nm pulses used to drive an OPO. Output from the OPO at 898 nm and 1256 nm can be frequency doubled through second harmonic generation to yield 449 nm and 628 nm pulses respectively. In another example, Raman converters can be utilized. The output of a pulsed alexandrite laser (e.g., 764 nm pulses) is frequency doubled through second harmonic generation to yield 382 nm pulses. These pulses then pass through a Raman cell including Deuterium Hydride (HD) gas. Careful selection of the input pulse can yield, for example, output laser pulse of 443 nm, 527 nm, and 650 nm. Other types of pump lasers, e.g., Nd:YAG and Nd:YLF, and other gases for the Raman cell, e.g., Deuterium ($D_2$) or methane ($Ch_4$), can be used. Moreover, some combination of all or some of these techniques and lasers can be used to produce the desired pulse wavelengths.

The pulsed laser beam produced by pulsed laser 110 is split into object and reference beams by the beam splitter C1, typically a polarizing beamsplitter cube. The polarizations and relative intensities of the object and reference beams (i.e., the beam ratio) are controlled by retarders P1 and P2, typically half-wave plates.

The object beam is then expanded and collimated by a collimator formed through the combination of lenses L1 and L2. Next, the object beam is reflected by beamsplitter cube C2 into spatial light modulator (SLM) SLM where the object beam wavefront is intensity modulated. Spatial light modulator SLM as illustrated is a reflective SLM which rotates the polarization state of the object beam. In general, a variety of different SLMs can be used including, but not limited to, a transmissive LCD panel, a reflective LCD panel, an optically addressed LCD panel, a digital micro-mirror array, film, or a transparency. The SLM typically receives image input via a video cable from a computer system (not shown). Additionally, multiple SLMs can be used having images generated in parallel by multiple central processing units or computer systems. Thus, the response time of the SLM is typically an important parameter. Examples of SLMs for use in hologram recorder 100 include the Digital Direct Drive Image Light Amplifier (D-ILA®) series of reflective LCD devices manufactured by the Victor Company of Japan, Ltd. (JVC), binary SLMs (e.g., for fabricating HOEs), and digital micromirror devices (DMDs). Additionally, a single multiple color SLM can be used, or multiple SLMs can be used (typically one SLM for each beam color). The images displayed on the SLM, and thus the images used to intensity modulate the object beam, are typically computer graphics images (either rendered or converted images of real objects) designed and/or processed for recording as holograms.

The modulated wavefront is relayed and filtered by the lens pair L3 and L4 and aperture A1 to then form an image on a band-limited diffuser or an anisotropic diffuser BLD. Note that, in general, the diffuser can be located in a variety of different positions throughout the system. The image then passes through a Fourier transform lens FTL thereby generating the desired object beam wave front at the holographic recording material positioned oil recording plate RP. Note that although hologram recorder 100 is shown using lens pair L3 and L4, to, for example, remove undesired effects such as, but not limited to, high frequency image components such as pixel or grid artifacts that resulted from an SLM display with pixels, a variety of different optical systems can be used.

In reference beam optical system 140, the reference beam is transmitted through path length matching optics (mirrors M1, M2, M3, and M4) and illuminates the reference beam-shaping aperture A2. Path length matching optics are used to adjust the path length of the reference beam path to match that of the object beam, or to at least bring the two paths within a distance of each other that is less than or equal to the coherence length of pulsed laser 110. For some pulsed lasers, the coherence length can be on the order of several millimeters. The image of shaping aperture A2 is then relayed via reference beam relay optics L5 and L6 to the holographic recording material at recording plate RP. As shown, the angle of incidence of the reference beam with respect to the surface normal of the holographic recording material at recording plate RP is preferably oblique, and further preferably approximates 45°. In other examples, the angle of incidence of the reference beam with respect to the surface normal of the holographic recording material is approximately 0°. A variety of different techniques can be used steer either or both of the reference beam and the object beam. For example, the devices and techniques of the aforementioned '088 patent can be utilized. Finally, the object anal reference beams are superimposed at the holographic recording material on recording plate RP producing the interference pattern required for hologram (or hogel) recording.

In the example of FIG. 1, the optics systems 130 and 140 are generally kept stationary during the operation of hologram recorder 100 while the synchronized holographic recording material translating system 120 is used to reposition the holographic film located at recording plate RP for each hogel that is recorded. Synchronized holographic recording material translating system 120 is typically a computer controlled x-y translation system. In one example, synchronized holographic recording material translating system 120 includes a 300AT series positioning system manufactured by the Daedal Division (Irwin, Pa.) of the Parker Hannifin Corporation and an ACR2000 position controller manufactured by Acroloop Motion Control Systems, Inc., of Chaska, Minn. In systems where the holographic recording material is kept stationary, similar devices and techniques can be used to translate object beam optical system 130 and reference beam optical system 140 with respect to the recording material. Moreover, devices and techniques for synchronizing device translation, SLM computer graphics image display, and laser pulsing are described in greater detail in the aforementioned '759 application.

It should be noted that it is well within the skill of one having ordinary skill in the art to substitute different optical components for many of the specific optical components shown in FIG. 1. For example, a variety of different polarizing devices, beam splitters, collimating optics, lenses, SLMs and mirrors can be used in hologram recorder 100. Additionally, although FIG. 1 illustrates a system for producing reflection holograms, systems for producing transmission holograms using the devices and techniques described above can also be implemented.

The basis unit for the digital hologram displays described herein is the holographic element, or "hogel". Each hogel is capable of storing the intensity and direction for millions of light rays, as distributed by angular orientation. A hogel is formed through the interference of a transformed beam of light with a (usually collimated) reference beam. In the simplest form, the transform would be a Fourier transform of a greyscale mask or image, accomplished via the placement of the mask at the back focal plane of a lens. As described in the '088 patent, introduction of a digital optical element is typically coincident with the mask that produces band-limited diffusion of the focused beam at the transform plane. This element can be used to create a diffuse spot of light of any desired shape or size. A reference beam, typically composed of a non-diffuse, but nominally planar wavefront, may be introduced into the diffuse spot from any direction in order to form the hogel interference pattern. The hogel is an interference pattern that can reproduce the specific angles and intensities of the data beam when illuminated with a replica of the reference beam or the phase conjugate of the reference beam. Thus, the data beam contains the perspective, intensity, and possibly also the phase information for the hogel area on the hologram plane, and that information is encoded through interference with the reference beam. As either the film or the optics are indexed (e.g., translated), an array of hogels is recorded or "written" in the medium through successive interference with the reference beam. The reference beam angle may change for each hogel so that the final array may be illuminated with a variety of different light sources including diverging point sources or a converging beam, if desired, without distortion of the image. This also enables a single point source illumination beam to substantially fulfill the Bragg condition for each hogel on replay.

Figure 2:
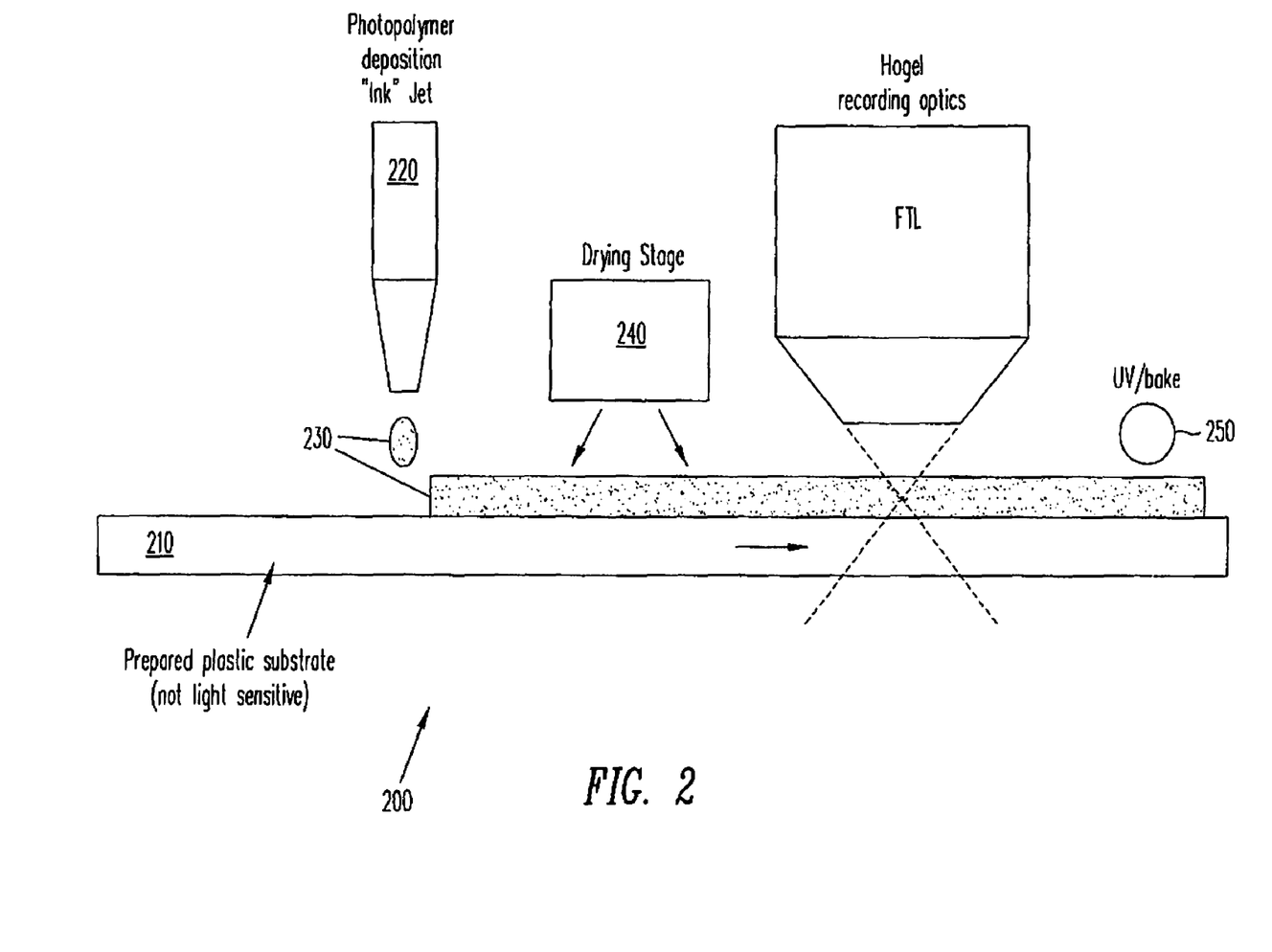
FIG. 2 is a schematic diagram of a hologram production device using a recording material deposition system.

FIG. 2 is a schematic diagram of a hologram production device using a recording material deposition system 200. Recording material deposition system 200 provides the holographic recording material in which various hogels are recorded. Thus, for example, recording material deposition system 200 provides a recording material that is located (either directly or via one or more substrates) on recording plate RP of the hologram recorder of FIG. 1.

Substrate 210 provides a rigid or semi-rigid foundation for the deposition of holographic recording material 230. Holographic recording material 230 is deposited on substrate 210 using deposition jet or nozzle 220. In addition to various components of a complete hologram recorder such as optics FTL (and numerous other components not illustrated), recording material deposition system 200 includes other components used to prepare (e.g., pre-process) and develop (e.g., post-process) holographic recording material 230. Such components include, for example, drying stage 240 and UV light source or heater 250.

Thus, system 200 provides for both the deposition of holographic recording material 230 and a mechanism by which the holographic recording material becomes photosensitive or is rendered photosensitive (e.g., activated). Once photosensitive material is deposited onto the base media within a hologram writer, the digital hologram can then be written into that photosensitive material directly after deposition. This technique is somewhat analogous to ink-jet printing, in which ink is ejected in small droplets onto the paper base media that is inserted into the machine. A hologram recording device that integrates recording material deposition system 200 results in a machine with basically two consumables—photosensitive "ink" material which would be dispensed from a vessel that could be routinely replaced, and non-photosensitive base material, typically a transparent polymer substrate, that would be loaded into the machine on a per-hologram or per-several-hologram basis.

Because, the holographic recording material is deposited in a liquid form, a drying stage 240 (e.g., air dryer, gas flow device, heat lamp, IR lamp, or the like) can be used to provide material stability and placement with respect to the substrate. Such a dryer stage can also be used to pre-sensitize the photosensitive material if desired, or another device (e.g., an appropriate light source) can be used for pre-sensitization. Still other devices (not illustrated) can be included. For example, depending on the type of jets/nozzles used to deposit the holographic recording material, the desired thickness of the holographic recording material, and the desired pattern of the holographic recording material, various dies, gates, trowels, etc., calnbe used to smooth and/or shape the deposited film. In general, various different devices and techniques can be used to pre-process holographic recording material 230 in order to prepare it for hologram recording.

Similarly, various post-processing steps can be accommodated by system 200. For example, depending on the type of photosensitive material used, certain post-recording/writing steps may be desirable. Thus, the UV source 250 provides the UV curing used with many photopolymerizable materials. Other post-processing techniques (e.g., heating, cooling, mechanical forming, laminating, protective coating deposition, etc.) can be implemented.

A variety of different types of holographic recording material can be used with the techniques discussed herein. One example of the type of recording materials that can be used is photopolymerizable compositions (photopolymers) because of their image recording capabilities and their relative ease of use. Photopolymers include a wide range of materials that undergo physical, chemical, or optical changes through selective polymerization when exposed to light. Photopolymers capable of recording volume phase holograms include those developed by Canon Incorporated (based on polyvinyl carbazole), Polaroid Corporation (based on polyethylene amine/acrylate), Daiso Co. Ltd., Nitto Denko Co., and E. I. du Pont de Nemours and Company (based on polyvinyl acetate and polymethyl methalcrylate). Those having ordinary skill in the art will readily recognize that a variety of different photopolymer compositions can be used in the practice of the inventions described herein. Examples of suitable photopolymer films are provided by E. I. du Pont de Nemours and Company under the trade designations, for example, OmniDex™ 706, OmniDex™ 801, HRF-800X001-15, HRF-750X, HRF-700X, HRF-600X, and the like.

Numerous other holographic recording materials can be used, depending in part on the nature of the hologram production technique. Those materials include, but are not limited to: specialized photopolymer systems used for rewritable systems, such as the polymer systems using two independently polymerizable chemical systems (low-refractive index matrix precursors and high-refractive index photopolymerizable monomers) developed for holographic storage by InPhase Technologies; so-called living radical polymers (where polymer growth terminals can be temporarily protected by protection bonding thereby enabling polymerization to be well controlled, including being stopped and started at will); fully functionalized photorefractive polymers (polymers in which both the photoconductivity and the non-linear optical capability reside within the polymer itself); traditional photorefractive materials such as bismuth silicon oxide ($Bi_{12}SiO_{20}$), lithium niobate ($LiNbO_3$), barium titanate ($BaTiO_3$), cadmiun sulfide (CdS), gallium arsenide (GaAs) and indium phosphide (InP); classes of chalcogenide compounds; thermally-deformable materials; liquid crystals; polymer-dispersed liquid crystals; organic photorefractive polymers, and the like. In some embodiments, various added solvents can be used to facilitate the smooth flow and deposition of the recording material.

As noted above, various aspects of a particular recording material deposition system will generally depend on the type of holographic recording material used. In some instances, multiple different holographic recording materials can be used, and thus systems like recording material deposition system 200 can have multiple jets/nozzles for depositing different recording materials as well as various pre-processing and post-processing devices suitable for respective recording materials. In still other examples, certain recording materials use multiple component materials, and thus two or more materials are either mixed before delivery to a deposition head (e.g., jet 220) or separately deposited and thus combined on a substrate.

Numerous different deposition technologies can be used to apply holographic recording material 230 to substrate 220, although they generally rely on some deposition technology compatible with the deposition of liquid material. For example, one or more simple nozzles can be used to selectively deposit holographic recording material on a substrate. More sophisticated devices, such as the spin-on coating and spray coating devices used for semiconductor and MEMS processing, can also be used. These devices are generally designed to provide uniform, defect-free photopolymer (e.g., UV photoresist) layers on wafers. For example, some direct spray coating systems use ultrasonic spray nozzles with specially designed droplet filters. During the spray coating process a swivel arm of the spray-coating unit is translated across the substrate surface. Other system components are also important to the quality of the deposited film layer, such as precision pumps used to supply material to deposition heads.

Ink-jet deposition of photosensitive materials, particularly photopolymers can be employed using deposition technologies developed for polymer light-emitting diode (PLED) and organic LED (OLED) display manufacture. These manufacturing processes, often referred to as "Industrial Ink Jet" or "IIJ", make use of special dispensing systems and indexing techniques to create precise dot-arrays of the PLED or OLED materials on a rigid or flexible substrate. Examples of such deposition systems can be found in U.S. Published Patent Applications 200402311593 and 20040261700, both of which are assigned to Litrex Corporation, and are hereby incorporated by reference herein in their entirety. Similar devices are made by other manufacturers. These types of devices are capable of depositing photopolymer materials at desired thicknesses (e.g., up to 15 microns) to create holographic recording materials with similar characteristics to those provided by holographic film manufactures. Stich IIJ devices can also be used to provide recording material having arbitrary 2D and even 3D shapes, that is only areas of recording material that will definitely be exposed need be deposited. Moreover, multiple layers of recording material can be deposited one on top of the other, and specialized patterns can be deposited to conform with other structures, for example separately fabricated active elements (e.g., switches, pixels, LEDs, and the like) and passive elements (e.g., insulators, reflectors, and the like).

IIJ devices, such as those described in the aforementioned Litrex patent applications, can use a variety of sophisticated nozzle or ink jet technologies for deposition heads. For example, one class of deposition heads are known as shear mode piezo transducer (PZT) deposition heads. Other types of deposition heads such as thermal or bubble deposition heads, continuous drop deposition heads, PZT valves, and microelectromechanical valves can also be used. In the case of shear mode PZT deposition heads, multiple nozzles are typically employed on a single deposition head. Each nozzle includes rigid or semi-rigid sidewalls (or if shaped like a tube, a single continuous sidewall) and a PZT located on a diaphragm oriented on the nozzle opposite the nozzle output. Fluid is supplied to the nozzle through one or more conduits, and a fluid channel is generally formed between the diaphragm and the nozzle sidewalls. When driven by a controller, the PZT in turn drives the diaphragm, causing acoustic waves to flow through the fluid channel and forcing fluid out of the nozzle. The shape, volume and timing of the droplets ejected by the nozzle are controlled (at least in part) by the control signals applied to the PZT. In this way, very precise droplets or fluid can be deposited on to a substrate.

In general, deposition heads (e.g., nozzles, ink jets, and the like) can be mounted to computer controlled positioners for accurate placement and/or translation with respect to the substrate, or can be held stationary while the substrate is translated with respect to the deposition head, e.g., using a holographic recording material translating system, such as system 120 of FIG. 1. Such devices can be used to reposition various portions of the as-deposited holographic recording material as desired. Moreover, movement of such systems can be synchronized with other parts of the material deposition system or hologram recording system as necessary.

As noted above, because the holographic recording material is deposited in liquid form, it is necessary to have a rigid or semi-rigid substrate on which to deposit the material. In the system of FIG. 2, substrate 210 is a plastic substrate. In some embodiments where a reference beam is introduced from the side of the recording material opposite that of lens FTL, i.e., where FTL provides only the object beam, it will be necessary that substrate 210 be sufficiently transparent to permit adequate transmission of the reference beam. In still other embodiments, glass substrates can be used. In still other embodiments, more flexible substrates can be used, in addition to a rigid substrate 210, to, for example, facilitate removal of the holographic recording material and subsequent dimensional stability of same. Thus, a flexible base sheet (not shown) can be placed on substrate 210 before holographic recording material 230 is deposited, so that the resulting holographic recording material can more easily be removed from the system as it is attached to the base sheet. Such base sheets are often used in commercially available photopolymer films, and can be formed from conventional polymer films (typically not photosensitive), such as polyethylene, polypropylene, cellulose, cellulose acetate butyrate (CAB), polyvinyl chloride (PVC), and polyethylene terephthalate (PET). Additionally, base sheet material can be used without (i.e., instead of) the more rigid substrate 230, and can be supplied and/or taken-up in rolled format.

Still other material layers can be deposited or applied to further protect the resulting hologram. For example, either before or after the holographic recording material is deposited, a barrier layer can be deposited or applied to the holographic recording material. Barrier layers are useful to prevent interlayer diffusion of sensitizing dyes within the holographic recording material layer, and to provide protection from oxygen and other environmental attributes during exposure. A barrier layer can also serve as a chemical barrier allowing the use of a coupling fluid or index matching fluid (e.g., a paraffinic hydrocarbon) during exposure of the hologram. When applied before hologram recording, a barrier layer must be transparent to the light to be carried through it, i.e., for exposing holographic recording material, and is preferably non-birefringent. Examples of suitable barrier layer materials include transparent polymers such as polyvinyl alcohol (PVA). As desired, additional non-recording material layers can be deposited or applied, such as adhesives, protective coatings, and the like.

One potential benefit to the devices and techniques described in the present application is the ability to use photosensitive materials that have limited shelf-life when exposed to air after dispensing. Since the hogels are typically recorded in a relatively short time after holographic recording material deposition, some of these shelf-life issues can be avoided. Using freshly deposited holographic recording material can also provide benefits such as increased material sensitivity and improved brightness of recorded holograms. Additionally, it is possible to integrate the deposition and recording heads in a relatively inert environment, if desirable, to avoid air-contact altogether. The material deposition approach has an additional potential benefit in that the size limitation for holograms recorded is generally limited only by the substrate size. Very large scale plotter-like devices or large format ink-jet devices can make use of the technique to create single-piece holographic images, holographic optical elements, or diffractive projection screens and diffusers.

Ink-jet digital holography has many applications in addition to the obvious image-recording capabilities. For instance, the process can be used to create specialized holographic optical elements or diffusers that could be in turn integrated into other products. The process itself can be integrated into photonic computing manufacturing processes in which diffractive structures are critical for switching. There are economic advantages to the approach as well. The complexity of a machine using this approach might be reduced, due to the elimination of the need for a light tight container for pre-exposed material. The substrate, not being light-sensitive itself, can be more easily transported, stored, and handled than current pre-coated photosensitive materials. Finally, the ink-jet business model could be applied, in which consumables of "ink" (in this case photosensitive material or photopolymer), and substrate (the "paper" of the system) are supplied and replenished on a regular basis with ease by the user.

Figure 3:
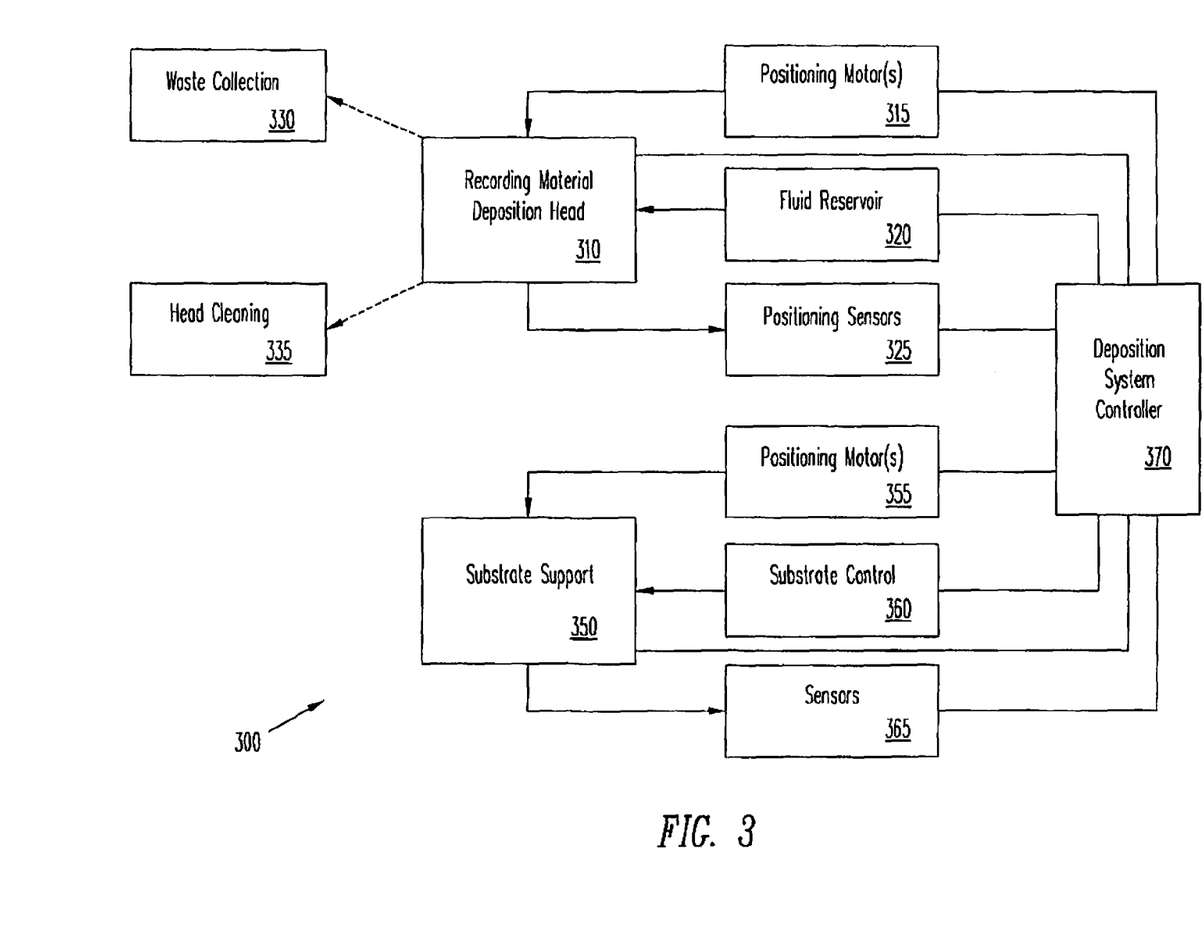
FIG. 3 is a schematic diagram further illustrating components of a recording material deposition system.

FIG. 3 is a schematic diagram further illustrating components of a recording material deposition system 300. For simplicity, certain elements of the deposition system and hologram recording system are not shown in FIG. 3. The main components of system 300 include one or more recording material deposition heads 310 (each having one or more nozzles), substrate support 350, and deposition system controller 370.

Deposition system controller 370 provides requisite control signals to various deposition held positioning motor(s) 315. In one example, only a single deposition head positioning motor is used, and that motor translates recording material deposition head 310 over a suitable substrate much like a conventional ink jet printer head is translated across a sheet of paper. In still other examples, various motors control numerous degrees of freedom such as: rotational position or pitch of the deposition head, height of the deposition head relative to a substrate, and lateral position of the deposition head. In support of the mechanisms for positioning recording material deposition head 310, one or more positioning sensors 325 (e.g., transducers, position indicators, photodetectors. etc.) can used in and around recording material deposition head 310. Information from those sensors is provided to deposition system controller 370 for use in managing the position of recording material deposition head 310, and indeed overall operation of system 300. Note that other sensors (not shown) can also be used to monitor system operation. For example, a camera can be mounted to deposition head 310. The camera can be used for head positioning and nozzle alignment, but can also be used to analyze recording material as it is deposited to ensure proper drop size, flow, thickness, etc.

Control of individual nozzles, e.g., the aforementioned PZT control signals, is typically provided directly to recording material deposition head 310 by controller 370. Various different types of software can be used to produce desired recording material patterns as will be known to those having ordinary skill in the art. Additionally, fluid reservoir 320 provides one or more components of the holographic recording material deposited by head 310. Fluid reservoir 320 can be monitored and/or controlled by deposition system controller 370. In embodiments where there are multiple heads/nozzles supplying different materials, multiple fluid reservoirs will typically be implemented. In some embodiments, multiple interchangeable deposition heads can be used to provide different types of material deposition.

In addition to the basic control and operation of recording material deposition head 310, there can be system elements used to support deposition heads and/or the deposition process. For example, waste collection 330 can include devices (e.g., gates, dies, catch basins, etc.) to collect and/or monitor excess or waste material. Similarly, head cleaning unit 335 can include various blotters, wipers, and associated motors used to remove excess material from deposition head 310 and to prevent clogging of nozzles on the deposition head. In some embodiments, head cleaning unit 335 is used to periodically clean recording material deposition head 310. The deposition head can, for example, be moved into position over head cleaning unit 335 and wiped clean. Head cleaning unit 335 can further include a roll of blotting material that is advanced with each cleaning operation. Numerous other devices can be included, such as deposition head storage or capping devices, material analyzers, heaters, material pre-processors, material post-processors, and the like.

Substrate support 350 is typically used to support, move, and/or manipulate one or more substrates on which holographic recording material is deposited. In systems where the recording material deposition head(s) are kept in a fixed position (or where it is otherwise desirable), substrate support 350 can be used to position the substrate relative to deposition heads. Accordingly, positioning motor(s) 355 and various sensors 365 can be implemented much in the same way as motor(s) 315 and sensors 325. Thus, motor(s) 365 can be used to position the substrate support with respect to deposition head 310 along one or more axes. In combination with motor control of deposition head 310, numerous degrees of freedom (translational and rotational) can be provided.

Substrate control 360 represents a variety of other devices or features that can be included with substrate support 350. For example, substrate support 350 can include various substrate holding mechanisms (e.g., claims, rails, guides, chucks, etc.) for engaging and positioning substrates. Dryers or material curing devices can also be included with substrate support 350 and controlled by substrate control 360. Numerous other additional components will be known to those having ordinary skill in the art.

Although system 300 is designed to be automated and to operate under the control of deposition system controller 370, various manual controls can also (or alternately) be included. Thus, manual adjustment devices such as a knob turning a worm gear or any other mechanical adjustment can be used to replace one or more of the motors described. Similarly, various automated sensors can be replaced with devices (e.g., scales, labels, indicator lights, etc,) used to assist in the manual inspection and monitoring of system 300. Deposition system controller 370 is typically implemented as one or more computer systems including: one or more processors, memory (e.g., RAM, ROM, flash memory, and/or any other suitable electronic storage media), I/O devices, and the like. Moreover, deposition system controller 370 typically executes one or more programs providing various control functionality and using well known user interface techniques.

Those having ordinary skill in the art will readily recognize that a variety of different types of electronic, optical, and mechanical components and materials can be used in place of the components and materials discussed above. For example, for certain applications, e.g., horizontal parallax-only holograms, cylindrical optical components can be used instead of spherical optics. Moreover, the description of the invention set forth herein is illustrative and is not intended to limit the scope of the invention as set forth in the following claims. Variations and modifications of the embodiments disclosed herein may be made based on the description set forth herein, without departing from the scope and spirit of the invention as set forth in the following claims.

What is claimed is:

1. A method comprising:
    mounting a substrate in a recording system;
    mixing two or more materials to generate at least one component of a holographic recording material;
    after the mounting and after the mixing, depositing the at least one component of the holographic recording material on a first portion of the substrate to form a first portion of a holographic recording material layer;
    providing data to a spatial light modulator;
    intensity modulating an object beam from a laser with the spatial light modulator;
    coupling the object beam into the first portion of the holographic recording material layer;
    exposing the first portion of the holographic recording material layer to an interference pattern formed by a reference beam from the laser and the object beam from the laser; and
    after the exposing the first portion of the holographic recording material layer, unmounting the substrate from the recording system.

2. The method of claim 1 wherein the depositing further comprises:
    forcing the at least one component of a holographic recording material through a fluid channel.

3. The method of claim 1 further comprising:
    supplying the at least one component of a holographic recording material from a reservoir.

4. The method of claim 1 wherein the depositing further comprises:
    sending at least one control signal to a material deposition head.

5. The method of claim 4 wherein the material deposition head includes at least one of: an ultrasonic spray nozzle, an ink jet nozzle, a shear mode piezo transducer (PZT) deposition device, a thermal deposition device, a bubble deposition device, continuous drop deposition device, a PZT valve, or a micromechanical valve.

6. The method of claim 1 further comprising:
    translating at least one of a material deposition head or the substrate.

7. The method of claim 1 further comprising:
    processing the at least one component of the holographic recording material to provide material stability to the holographic recording material layer.

8. The method of claim 7 wherein the processing further comprises at least one of:
    heating the at least one component of the holographic recording material;
    exposing the at least one component of the holographic recording material to a light source; and
    applying a gas to the at least one component of the holographic recording material.

9. The method of claim 1 further comprising:
    holding the substrate on a material holder; and
    translating the object beam with respect to the holographic recording material layer.

10. The method of claim 1 further comprising:
    forming at least one hogel in the holographic recording material layer, wherein the at least one hogel corresponds to the data provided to the spatial light modulator.

11. The method of claim 1 further comprising:
    transmitting the data to the spatial light modulator using a computer coupled to the spatial light modulator, wherein the data corresponds to a hogel for a rendered image.

12. The method of claim 1 wherein the laser is at least one of a pulsed laser or a continuous wave laser.

13. The method of claim 1 wherein the mounting the substrate comprises mounting the substrate on a translating system.

14. The method of claim 1 wherein the exposing is performed directly after the depositing.

15. The method of claim 1, wherein the exposing comprises:

exposing the first portion of the holographic recording material layer to a first interference pattern for a first hogel;

translating at least one of a the object beam or the substrate, wherein the translating is performed after the exposing the first portion; and exposing a second portion of the holographic recording material layer to a second interference pattern for a second hogel, wherein:

the second portion is different from the first portion, and the second interference pattern is different from the first interference pattern, and the exposing the second portion is performed after the translating.

16. The method of claim 1 further comprising:

splitting a coherent beam from the laser in a beam splitter to generate the object beam and the reference beam.

17. The method of claim 1 further comprising, after the exposing the first portion of the holographic recording material layer, and before the unmounting:

depositing at least one component of the holographic recording material on a second portion of the substrate to form a second portion of a holographic recording material layer;

providing refreshed data to the spatial light modulator;

intensity modulating the object beam from the laser with the spatial light modulator;

coupling the object beam into the second portion of the holographic recording material layer; and exposing the second portion of the holographic recording material layer to an interference pattern formed by the reference beam from the laser and the object beam from the laser.

18. The method of claim 1 wherein the exposing is performed within a predetermined time duration after the depositing.

19. The method of claim 18 wherein the predetermined time duration is based at least in part on a shelf life of the at least one component of the holographic recording material.

20. The method of claim 1 wherein the holographic recording material comprises an updateably recordable material.

21. The method of claim 1 further comprising, after the depositing and before the exposing the first portion of the holographic recording material layer:

activating the first portion of the holographic recording material layer, wherein the activating causes the first portion of the holographic recording material layer to be photosensitive.

22. The method of claim 1 further comprising, after the depositing and before the exposing the first portion of the holographic recording material layer:

depositing at least one additional component of the holographic recording material on the first portion of the substrate to form the first portion of the holographic recording material layer.

23. The method of claim 1 further comprising, after the depositing:

depositing a second holographic recording material layer on top of the first portion of the holographic recording material layer.

24. The method of claim 23 wherein the second holographic recording material layer comprises a barrier layer.

25. The method of claim 1 wherein the first portion of a holographic recording material layer is a component of a holographic optical element.

26. The method of claim 1 wherein:

the depositing is performed using a deposition head;

the exposing is performed using an optical recording head; and the deposition head and the optical recording head are integrated into a common positioning mount.

27. A method comprising:

mounting a substrate in a recording system;

after the mounting, depositing at least one component of a holographic recording material on a first portion of the substrate to form a first portion of a holographic recording material layer, wherein the substrate provides a rigid or semi-rigid foundation for the depositing;

providing data to a spatial light modulator;

intensity modulating an object beam from a laser with the spatial light modulator;

coupling the object beam into the first portion of the holographic recording material layer;

exposing the first portion of the holographic recording material layer to an interference pattern formed by a reference beam from the laser and the object beam from the laser; and after the exposing the first portion of the holographic recording material layer, unmounting the substrate from the recording system.

28. The method of claim 27 wherein the depositing further comprises:

forcing the at least one component of a holographic recording material through a fluid channel;

sending at least one control signal to a material deposition head;

forming at least one hogel in the holographic recording material layer, wherein the at least one hogel corresponds to the data provided to the spatial light modulator; and translating at least one of a material deposition head or the substrate.

29. The method of claim 27 further comprising:

holding the substrate on a material holder; and translating the object beam with respect to the holographic recording material layer.

30. The method of claim 27, wherein the exposing comprises:

exposing the first portion of the holographic recording material layer to a first interference pattern for a first hogel;

translating at least one of a the object beam or the substrate, wherein the translating is performed after the exposing the first portion; and exposing a second portion of the holographic recording material layer to a second interference pattern for a second hogel, wherein:

the second portion is different from the first portion, and the second interference pattern is different from the first interference pattern, and the exposing the second portion is performed after the translating.

31. The method of claim 27 further comprising, after the exposing the first portion of the holographic recording material layer, and before the unmounting:

depositing at least one component of the holographic recording material on a second portion of the substrate to form a second portion of a holographic recording material layer;

providing refreshed data to the spatial light modulator;

intensity modulating the object beam from the laser with the spatial light modulator;

coupling the object beam into the second portion of the holographic recording material layer; and exposing the second portion of the holographic recording material layer to an interference pattern formed by the reference beam from the laser and the object beam from the laser.

32. The method of claim 27 wherein:

the exposing is performed within a predetermined time duration after the depositing; and the predetermined time duration is based at least in part on a shelf life of the at least one component of the holographic recording material.

33. The method of claim 27 further comprising, after the depositing and before the exposing the first portion of the holographic recording material layer:

activating the first portion of the holographic recording material layer, wherein the activating causes the first portion of the holographic recording material layer to be photosensitive.

34. The method of claim 27 wherein the first portion of a holographic recording material layer is a component of a holographic optical element.

35. The method of claim 27 wherein:

the depositing is performed using a deposition head;

the exposing is performed using an optical recording head; and the deposition head and the optical recording head are integrated into a common positioning mount.

36. A system comprising:

means for mounting a substrate in a recording system;

means for, after the mounting, depositing at least one component of a holographic recording material on a first portion of the substrate to form a first portion of a holographic recording material layer, wherein the substrate provides a rigid or semi-rigid foundation for the depositing;

means for providing data to a spatial light modulator;

means for intensity modulating an object beam from a laser with the spatial light modulator;

means for coupling the object beam into the first portion of the holographic recording material layer;

means for exposing the first portion of the holographic recording material layer to an interference pattern formed by a reference beam from the laser and the object beam from the laser; and means for, after the exposing the first portion of the holographic recording material layer, unmounting the substrate from the recording system.

\* \* \* \* \*